United States Patent [19]

Bench et al.

[11] Patent Number: 4,835,715
[45] Date of Patent: May 30, 1989

[54] OUTDOOR AMBIENT TEMPERATURE DETERMINATION

[75] Inventors: Ronald W. Bench, Kirkville; Robert W. Peitz, Jr., Fayetteville; John M. Palmer, Syracuse; Daryl G. Erbs, Canastota, all of N.Y.

[73] Assignee: Carrier Corporation, Syracuse, N.Y.

[21] Appl. No.: 942,733

[22] Filed: Dec. 17, 1986

[51] Int. Cl.[4] .............................................. F25D 21/06
[52] U.S. Cl. .................................... 364/557; 364/506; 62/155; 62/156
[58] Field of Search ............... 364/505, 506, 550, 551, 364/557; 62/159, 160, 156, 126, 129, 324.6; 236/1 E; 165/11.1, 26, 27, 29

[56] References Cited

U.S. PATENT DOCUMENTS

| | | | |
|---|---|---|---|
| 4,209,994 | 7/1980 | Mueller et al. | 364/505 |
| 4,338,791 | 7/1982 | Stamp, Jr. et al. | 165/29 |
| 4,380,156 | 4/1983 | Ecker | 62/324.6 |
| 4,381,549 | 4/1983 | Stamp, Jr. et al. | 165/11.1 |
| 4,432,210 | 2/1984 | Saito | 364/557 |
| 4,457,137 | 7/1984 | Kohzuma | 62/160 |
| 4,484,452 | 11/1984 | Houser, Jr. | 62/160 |
| 4,645,908 | 2/1987 | Jones | 165/29 |
| 4,662,184 | 5/1987 | Pohl et al. | 62/156 |
| 4,683,939 | 8/1987 | Levine | 165/26 |

Primary Examiner—Parshotam S. Lall
Assistant Examiner—Ellis B. Ramirez
Attorney, Agent, or Firm—Robert H. Kelly

[57] ABSTRACT

An outdoor coil temperature detection scheme in a heat pump system effective for developing outdoor ambient temperature indications from outdoor coil temperature data, for use in heat pump control.

4 Claims, 1 Drawing Sheet

OUTDOOR AMBIENT TEMPERATURE DETERMINATION

BACKGROUND OF THE INVENTION

The invention herein relates to the field of outdoor ambient temperature determination, and particularly to making such a determination in the context of heat pump systems.

As is well known, heat pump systems are operable over a wide range of outdoor ambient temperatures. Nonetheless, even though the heat pump systems which are in use today can in fact operate over the entire wide range, it cannot be expected nor is it true that their effectiveness of operation is constant over the entire operational range. In fact, over certain portions of the operational range the level of performance of the heat pump system varies considerably. The ambient temperature is therefore, typically directly measured and forwarded to controller memory for conventional use in a well known control arrangement to operate the heat pump system in a fashion which provides optimal performance. According to this fashion, ambient temperature is measured directly by a dedicated temperature sensor which detects the instantaneous temperature in the ambient region of sensor placement and provides a signal or indication representative thereof through a suitable electric line.

Such a typical heat pump system further employs and detects other parameters, beyond merely measuring the outdoor ambient temperature. One of these measured parameters is the refrigerant temperature at the outdoor coil. Simply stated, temperature is thus measured at two outdoor locations in current heat pump systems, at a cost of course of employing and maintaining redundant temperature detection mechanisms. As a result, the heat pump control system is able effectively to modify operational parameters of the heat pump system including blower and compressor speed, for example, according to current ambient temperature conditions.

SUMMARY OF THE INVENTION

Accordingly, the invention herein is directed toward a heat pump arrangement which employs the outdoor coil or defrost sensor already present in the heat pump system to establish an indication of outdoor ambient temperatures without measuring them directly with an independent redundant, sensor dedicated to that specific purpose alone. In particular, the arrangement includes a conventional temperature sensor and an analog to digital (A/D) converter effective for driving a controller such as for example a microprocessor. The temperature sensor, according to the invention, is suitably established in the outdoor coil of the heat pump and is effective for providing current local temperature information to the controller suggestive of ambient conditions in the vicinity of outdoor coil. According to conventional techniques, the A/D converter transforms the outdoor coil temperature readings into digital form, which indications in turn are capable of interpretation and manipulation by the controller in view of other operational parameters and conditions of the heat pump system, thereby effectively promoting overall heat pump operation. Further, according to the invention, the controller is effective for developing a measure of the ambient temperature from temperature conditions at the outdoor coil according to the relationships: ambient temperature equals $K_1$ times outdoor coil temperature, when the heat pump is in its heating mode; and ambient temperature equals outdoor coil temperature minus $K_2$ in the cooling mode of operation, where $K_1$ and $K_2$ are operational constants which can be experimentally developed. Information in regard thereto is provided below.

DESCRIPTION OF THE PREFERRED EMBODIMENT

Figure 1:
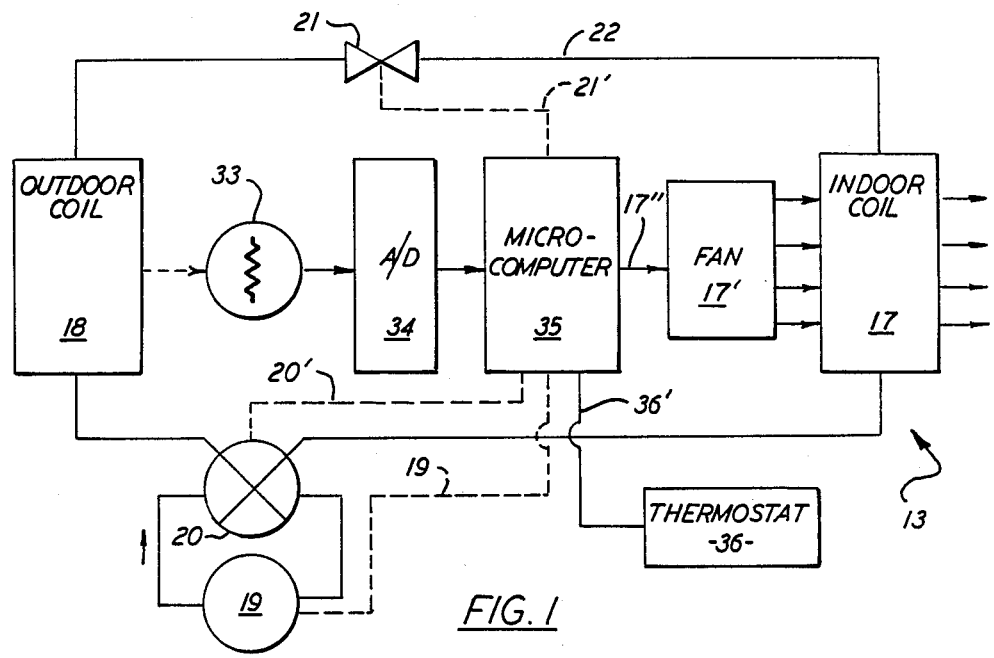
FIG. 1 shows in block diagram form, a typical heat pump arrangement, in which, according to the invention herein, the outdoor coil is effective for enabling the development of accurate ambient temperature detection.

FIG. 1 shows heat pump system 13 including indoor and outdoor coils, respectively 17 and 18, interconnected in a closed loop 22 for carrying a suitable refrigerant fluid in liquid and gaseous phases. The system further includes compressor 19 for driving gaseous refrigerant toward indoor or outdoor coil 17 or 18 through reversible four-way valve 20. Beyond that, system 13 includes expansion valve 21 in the indicated closed refrigerant circuit 22, which is well known in the art.

According to the invention herein, system 13 employs outdoor coil temperature sensor 33 effective for driving A/D converter 34 and controller, microcomputer or microprocessor 35 in order to establish an outdoor ambient temperature indication. Microprocessor 35 operation is influenced by temperature settings established at thermostat 36 and delivered to microprocessor 35 on line 36'.

According to a typical heat pump control technique, microcomputer 35 controls fan 17' along control line 17" to blow air across indoor coil 17 for heating or cooling, depending upon the mode of operation of said heat pump arrangement 13. Control line 17" carries a signal typically which is a function of ambient temperature "$a_T$" and compressor speed "$C_s$". One way to state this as a relationship is to suggest that fan speed "$F_s$" equals $a_T K_{13} + C_s K_{14}$ where $K_{13}$ and $K_{14}$ are operationally or experimentally determinable system dependent constants. Microcomputer 35 further controls the operation of expansion valve 21 along control line 21" to establish the amount of refrigerant passing therethrough as a function of ambient temperature "$a_T$" and compressor speed "$C_s$" according to a relationship similar to that controlling fan speed, except with the indicated constants being adapted or modified to conform to the exigencies of expansion valve hardware and operation.

Similarly, compressor 19 is microcomputer 35 controlled, in this case by signals along line 19', which are a function of ambient temperature "$a_T$" and a thermostat difference "$d_t$" which is a difference between a selected thermostat set point and actual room temperature. This compressor speed "$C_s$" function can be expressed as the sum $K_{21} a_T + K_{22} d_t$, where $K_{21}$ and $K_{22}$ are compressor specific constants, experimentally or operationally developed as before. Yet another control line 20' is apparent between microcomputer 35 and reversible four-way valve 20, effective for switching flow of refrigerant in loop 22 one way or the other, the direction of outflow from compressor 19 typically being non-reversible according to this version of the invention.

Figure 2:
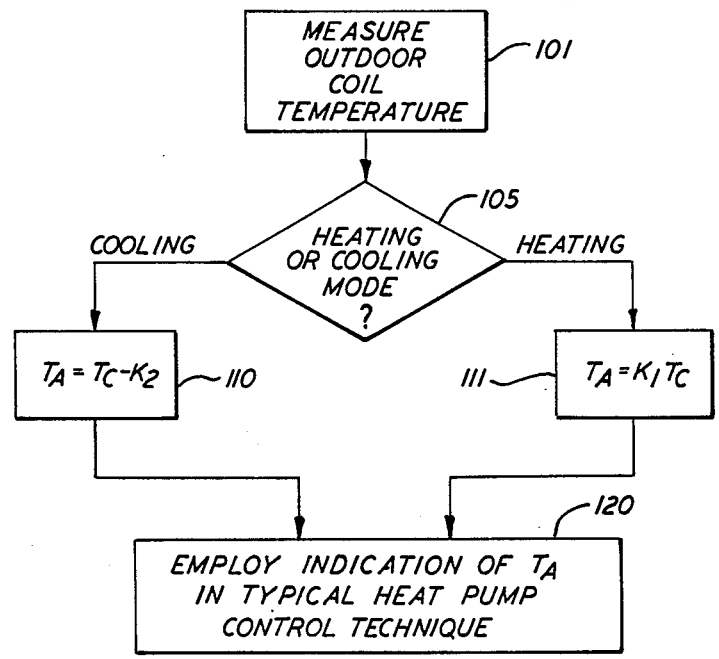
FIG. 2 shows a flow chart for developing ambient temperature from coil temperatures.

FIG. 2 shows the development of an ambient temperature indication by taking coil temperature measurements, as per block 101, and then after an evaluation at design block 105, of whether the heat pump is in a cooling or heating mode of operation, a mode characteristic constant $K_2$ (for cooling) or $K_1$ (for heating) is respectively subtracted from (as per block 110) or multiplied with (as per block 111) the coil temperature indication "$T_C$" to develop the desired measure of ambient temperature "$T_A$", for employment in the conventional heat pump control arrangement, according to block 120. According to a preferred version of the invention, the respective values of $K_1$ and $K_2$ are 1.12 and 10 degrees.

While this invention has been described with reference to a particular embodiment disclosed herein, it is not confined to the details set forth herein and this application is intended to cover any modifications or changes as may come within the scope of the invention.

What is claimed is:

1. In a heat pump system including a refrigerant loop having conduit connecting indoor and outdoor coils, an expansion valve and a compressor between the indoor and outdoor coils, and an arrangement for detecting refrigerant temperature in the outdoor coil, the temperature detecting arrangement including a temperature sensor interfaced with the outdoor coil for providing analog information of coil temperature, a controller means for controlling heat pump system operation, and an A/D converter operatively connected to said coil temperature sensor and said controller means for digitizing said analog information and supplying it to said controller means, said controller operatively connected to said A/D converter and the compressor effective for converting said digitized information into a measure of outdoor ambient temperature wherein said controller means employs a relationship $T_A = K_1 T_C$ to convert coil temperature indications into ambient temperature indications wherein $T_A$ indicates ambient outdoor temperature, $T_C$ indicates coil temperature, and $K_1$ indicates a heating mode operational constant.

2. The arrangement of claim 1, wherein said heating mode operational constant $K_1$ is approximately 1.12 degrees.

3. In a heat pump system including a refrigerant loop having conduit connecting indoor and outdoor coils, an expansion valve and a compressor between the indoor and outdoor coils, and an arrangement for detecting refrigerant temperature in the outdoor coil, the temperature detecting arrangement including a temperature sensor interfaced with the outdoor coil for providing analog information of coil temperature, a controller means for controlling heat pump system operation, and an A/D converter operatively connected to said coil temperature sensor and said controller means for digitizing said analog information and supplying it to said controller means, said controller operatively connected to said A/D converter and the compressor effective for converting said digitized information into a measure of outdoor ambient temperature wherein said controller means employs the relationship $T_A = T_C - K_2$ to convert coil temperature indications into ambient temperature indications wherein $T_A$ indicates said ambient outdoor temperature, $T_C$ indicates said coil temperature, and $K_2$ indicates a cooling mode operational constant.

4. The arrangement of claim 3, wherein said cooling mode operational constant $K_2$ is approximately 10 degrees.

* * * * *